Patented Mar. 29, 1938

2,112,357

UNITED STATES PATENT OFFICE

2,112,357

PROCESS OF MAKING CALCIUM SULPHATE-ZINC SULPHIDE PIGMENTS

Keith H. Butler, Elmhurst, Rodolphe A. Gagnon, Marshallton, Del., and James D. Prince, Linthicum Heights, Md., assignors, by mesne assignments, to E. I. du Pont de Nemours and Company, a corporation of Delaware No Drawing. Application March 27, 1935, Serial No. 13,274

11 Claims. (Cl. 134—78)

The present invention relates to processes of making co-precipitates of calcium sulphate and zinc sulphide, useful for the production of pigments, by inter-reacting in solution calcium, sulphide, zinc and sulphate ions and is particularly characterized by rapidly mixing the reactants and reducing to a minimum the time of contact of the precipitate with the mother liquor of the reaction or with any medium in which it is partially soluble.

This rapid striking and rapid handling method is applicable to any reaction between calcium, sulphide, zinc, and sulphate ions resulting in the formation of a co-precipitate of calcium sulphate and zinc sulphide, it is, however, particularly applicable to the reaction between calcium hydrosulphide and zinc sulphate and especially where more than one molecular proportion of zinc sulphate is allowed to react upon one molecular proportion of calcium hydrosulphide.

One result of this rapid striking and rapid handling method is to produce initially small particles of calcium sulphate and zinc sulphide and to prevent the growth of the initially formed zinc sulphide and more especially calcium sulphate particles.

Another very essential result of this novel method of our invention is to permit the formation of co-precipitates of a composition in which considerably more than one molecular proportion of zinc sulphide is combined with one molecular proportion of calcium sulphate.

A rapid striking and rapid handling method when applied to straight calcium sulphate is described in our co-pending application Serial No. 13,275 filed of even date herewith for Process of making gypsum of fine particle size.

In applying the principle of the invention in said application to the co-precipitation of calcium sulphate and zinc sulphide we found a number of valuable additional advantages relating particularly to the avoidance of losses of zinc compounds and hydrogen sulphide and to the pigmenting strength of the pigments prepared from such co-precipitates.

These results and advantages are obtained according to our invention in operating in the following manner:

A solution containing, for instance, the calcium and sulphide ions and a solution containing the zinc and sulphate ions are brought together in such a manner that not more than 5 minutes and preferably less than one minute of time elapses from the first contact of the reactants to complete interaction of the calcium and sulphate, and zinc and sulphide ions. The particles of calcium sulphate and zinc sulphide initially precipitated in this manner are very small and their growth can be stopped at a point where their size develops interesting possibilities provided the co-precipitate formed in this manner remains in contact with the undiluted mother liquor for not more than 1½ and preferably the whole cycle, including washing is completed in less than 5 hours.

This control of the interaction between calcium, sulphate, zinc and sulphide ions is applicable to any reaction in a liquid medium in which all four of these ions or their equivalents are present. These reacting conditions are, for instance, obtained when mixing solutions containing an alkali metal sulphide, including ammonium sulphide and a soluble calcium salt such as calcium chloride with solutions of zinc chloride and an alkali metal sulphate, or a suspension of zinc oxide in sodium sulphate or zinc sulphate, or a straight solution of zinc sulphate, which may or may not contain ammonium hydroxide or other ammonium salt, or by mixing, for instance, a solution containing zinc chloride and calcium chloride with a solution containing sodium sulphide and sodium sulphate.

It will be understood that the principle of rapid reaction between the calcium, sulphate, zinc and sulphide ions and of rapid handling of the so co-precipitated calcium sulphate-zinc sulphide is applicable to all the combinations cited above and in fact to the admixing of any two or more solutions which will give the desired co-precipitate.

The invention is also well applicable to the reaction between calcium hydrosulphide and zinc sulphate when the two are allowed to react with each other in any desired proportions.

It has been customary in all these processes, even on a laboratory scale to gradually add one reactant to the other reactant over an extended period of time as it had always been considered necessary to gradually build up the precipitate so that no unreacted material remained englobed in the precipitate. On a large scale, or manufacturing process, it always takes considerable time to mix or transfer large amounts of liquids and in such large scale manufacturing operations the precipitates of calcium sulphate and zinc sulphide have always been of large particle size. With our invention it is now for the first time possible to obtain on manufacturing scale precipitates of very small particle size.

One manner of preparing calcium sulphate-zinc sulphide pigments embodying the chemical reaction between calcium hydrosulphide and zinc sulphate is disclosed in an application by J. E. Booge, Serial No. 589,980, filed Jan. 30, 1932, for Calcium sulphate-zinc sulphide pigment, now Patent No. 2,016,537. It is shown in this application that in order to obtain pigments of satisfactory quality it is necessary to conduct the chemical reaction in such a manner that no excess hydrogen sulphide remains absorbed upon the co-precipitate when it is submitted to the calcination operation.

A different embodiment of the production of calcium sulphate-zinc sulphide pigments using the reaction between calcium hydrosulphide and zinc sulphate is described in an application by one of us, Prince, with M. L. Hanahan, Ser. No. 13,908, filed March 30, 1935, for Calcium sulphate-zinc sulphide pigments. In the process of this invention the reaction is so conducted that at the end of the strike the slurry contains free sulphuric acid and an excess zinc sulphate and the precipitate is then calcined under acid conditions.

The rapid striking and handling method of the present invention is exceedingly well suited for the preparation of calcium sulphate-zinc sulphide co-precipitates which can be further worked up according to the methods disclosed in these last two cited applications.

It will be understood that when one mol. of zinc sulphate in solution is added to one mol. of calcium hydrosulphide in solution, the following reaction occurs:

$$ZnSO_4 + Ca(SH)_2 \rightarrow ZnS + CaSO_4 + H_2S$$

The precipitation of the zinc ion is complete, no zinc sulphate remaining in solution. At the same time one mol. of $H_2S$ is liberated for each mol. of ZnS precipitated.

If the addition of zinc sulphate is continued after one mol. of zinc sulphate has reacted only so much additional zinc sulphide is precipitated as corresponds to the amount of hydrogen sulphide dissolved in the reaction liquor. In addition an equivalent amount of free sulphuric acid is formed which when a sufficient concentration is reached exerts a solubilizing effect upon the zinc sulphide.

If on the other hand one attempts to add the calcium hydrosulphide to excess zinc sulphate solutions one will in the beginning utilize practically all the hydrogen sulphide available in the calcium hydrosulphide but for each molecule of zinc sulphide formed there will be formed an equivalent of sulphuric acid according to the equation:

$$2ZnSO_4 + Ca(SH)_2 \rightarrow 2ZnS + CaSO_4 + H_2SO_4$$

and a point is soon reached where the concentration of the free sulphuric acid prevents further reaction between the zinc and sulphide ions and hydrogen sulphide is liberated, by the reaction of this free sulphuric acid with additional amounts of calcium hydrosulphide as will be added.

If according to our invention the two solutions of calcium hydrosulphide and zinc sulphate, the latter in more than equimolecular amount, are rapidly mixed, or brought together, the hydrogen sulphide liberated according to the equation:

$$ZnSO_4 + Ca(SH)_2 \rightarrow ZnS + CaSO_4 + H_2S$$

has no time to escape from the reaction mixture but will immediately react with the additional amounts of zinc sulphate and the free sulphuric acid formed will be diluted in the large amounts of reaction liquor to the point where it will not interfere with the formation of zinc sulphide.

In this manner we obtain a more complete utilization of the zinc and the sulphide ions.

This effect is illustrated by the following experiments:

Three strikes were made under identical conditions except that the time and rate of addition of the zinc sulphate solution to the calcium hydrosulphide solution was varied.

In the "rapid" strike the zinc sulphate solution was added in 5 seconds to the calcium hydrosulphide, the reaction mixture stirred for 5 minutes and then filtered, which took 32 minutes.

In the "slow" strike the zinc sulphate solution was added in 25 minutes, the mixture was then stirred for 10 minutes and filtered which last operation took 18 minutes.

In the third experiment, called "split" strike, we first added about 1 molecular amount of zinc sulphate to 1 molecular amount of calcium hydrosulphide over a period of 18 minutes, the mixture was then stirred for 2 hours, followed by the addition in 8 minutes of about ½ molecular amount of zinc sulphate; after 10 minutes additional stirring the precipitate was filtered off, which took 22 minutes.

The amounts of reactants used were the same in all 3 experiments, and were as follows:

In an 8 liter Pyrex glass jar was placed 1000 cc. of a calcium hydrosulphide solution containing 233 grams per liter of $Ca(SH)_2$ or a total of 233 grams $Ca(SH)_2$ (2.20 mols). To this was added, as explained above, 1,369 cc. of a zinc sulphate solution containing 391 g/l of $ZnSO_4$ (3.31 mols). The molar ratio of zinc sulphate to calcium hydrosulphide used was therefor 1.504:1.

All strikes were made at atmospheric pressure and at room temperature. Strikes were filtered on a vacuum filter and the precipitates were washed with three separate portions of 1000 cc. each of distilled water. The precipitates were then dried at 110° C. and analyzed; the filtrate and wash waters were analyzed separately.

The results are tabulated below:

| | Rapid | Slow | Split |
|---|---|---|---|
| *Filtrate analysis* | | | |
| g. $ZnSO_4$ in filtrate | 8.0 | 75.0 | 92.4 |
| g. $ZnSO_4$ in washings | 4.4 | 41.6 | 49.1 |
| Total g. $ZnSO_4$ | 12.4 | 116.6 | 141.5 |
| g. $H_2SO_4$ in filtrate | 48.8 | 13.0 | 3.1 |
| g. $H_2SO_4$ in washings | 30.6 | 6.5 | 2.3 |
| Total g. $H_2SO_4$ | 79.4 | 19.5 | 5.4 |
| g/l $ZnSO_4$ in filtrate | 6.56 | 57.3 | 77.0 |
| g/l $H_2SO_4$ in filtrate | 40.0 | 9.9 | 2.55 |
| *Analysis of precipitate* | | | |
| Percent ZnS | 50.88 | 44.13 | 42.17 |
| Molar ratio ZnS : $CaSO_4$ | 1.453 | 1.111 | 1.026 |

These results clearly show that in the rapid strike practically all the zinc sulphate has been converted into zinc sulphide and that the concentration of the free sulphuric acid in the mother liquor was not too high to prevent the reaction.

In the slow strike only a relatively small part of the zinc sulphate in excess of the equimolecular amount was precipitated.

As could be expected, in the split strike the amounts of zinc sulphate added after completion of the equimolecular reaction contributed practically nothing to the formation of zinc sulphide, the slight amount 0.026 mol. of additional zinc sulphide formed is attributed to the $H_2S$ dissolved in the mother liquor or absorbed on the originally precipitated zinc sulphide.

Attention is, however, called to one significant fact illustrated by these experiments and that is that it took nearly twice as long to filter the precipitate from the rapid strike as to filter the slow strike. This is a direct indication that the precipitate of the rapid strike consisted of particles much finer than those of the slow strike. This fact is further borne out by the results of the tinting strength of the pigments which are obtained by calcination of such precipitates, as will be referred to below.

It was also found that on equal zinc sulphide basis the pigments obtained from the rapid strike precipitates are of greater tinting strength than those obtained under otherwise identical working up and calcination conditions from slow strike precipitates.

The results of a series of comparative experiments are listed as follows:

| Time of strike | Percent ZnS in the pigment | Strength | Color |
| --- | --- | --- | --- |
| 3–5 seconds | 41.4 | 174 | 11+ |
| 3–5 seconds | 41.9 | 178 | 12+ |
| 10 minutes | 41.7 | 158 | 6 |

The increased strength obtained in our novel process is not only dependent upon the time of strike. It is also advisable to reduce to a minimum the time of contact of the precipitate with its mother liquor and the wash water. This also applies to the time which it takes to remove the excess hydrogen sulphide adsorbed upon the precipitate, which is partly done by physical means, for instance, by applying a vacuum to the pigment slurry, with or without washing and/or decantation or in case of a strike which is to be neutralized by chemical means.

Comparative experiments have been made and average results were obtained as follows:

A number of rapid strikes were made under identical conditions, the precipitated slurry was then handled, the excess $H_2S$ evacuated, namely filtered and washed in such a manner that it took various periods of time to complete this handling; the precipitates were then calcined under similar conditions to obtain maximum strength.

| Time of handling | Percent ZnS | Strength | Color |
| --- | --- | --- | --- |
| 1 hour | 50.0 | 206 | 12 |
| 3 hours | 50.0 | 200 | 12 |
| 16 hours | 49.1 | 162 | 12 |

Comparing these figures with those of the preceding table it must be understood that the tinting strength increases with increasing zinc sulphide content.

These figures clearly show the influence of time of handling upon the strength.

The influence of the time of evacuating the excess hydrogen sulphide on the color is illustrated by the following experiments which were made under identical conditions except that the time of evacuating the excess $H_2S$ from the raw pigment was varied:

| Time of $H_2S$ removal | Color |
| --- | --- |
| 5 minutes | 11+ |
| 30 minutes | 6 |

In considering these figures it must be remembered that a strength of 150 corresponds to that of a high grade commercial barium sulphate—zinc sulphide pigment of equivalent zinc sulphide content and that a color of 10 is commercially satisfactory, whereas colors below 10 indicate a yellowish cast which makes the pigment unsuited as a white pigment, whereas colors above 10 are very desirable.

The above comparisons between rapid and slow strike and handling procedures were all made upon strikes where the zinc sulphate solution was run into the calcium hydrosulphide solution.

The following experiments compare strikes where the calcium hydrosulphide solution was run into the zinc sulphate solution, where in the slow strike substantially no hydrogen sulphide could escape as long as the concentration of the free sulphuric acid formed immediately in the reaction mixture is sufficiently low.

Here, also, there is a decided advantage in obtaining a higher strength in the pigments obtained from the rapid strike precipitates.

In the strikes where the zinc sulphate solution was rapidly run into the calcium hydrosulphide solution the average strength was 166.4.

In the series of experiments where calcium hydrosulphide was slowly run into the zinc sulphate solution the average strength was 153.7, which differences are entirely attributed to the formation of smaller particles in the rapid strike.

No substantial difference in strength is, however, noted in the rapid strike procedure when the zinc sulphate is dumped into the calcium hydrosulphide or the calcium hydrosulphide solution is run into the zinc sulphate.

The rapid striking and rapid handling features of the present invention have each their individual effects upon the properties of the precipitated raw pigment.

The production of pigments of high zinc sulphide content, with its accompanying feature of avoidance of zinc losses are entirely the result of the rapid striking method. Similarly the formation of initially very small particles of zinc sulphide and calcium sulphate is to a very large extent dependent upon the rapid strike.

The rapid handling feature prevents the growth of the originally produced particles, particularly those of the calcium sulphate which in contact with the mother liquor of the reaction, particularly when this is acid, have a strong tendency to convert into large particles by which the strength of the pigment is lowered.

In the practical embodiment of our invention we can achieve the rapid strike and the rapid handling of the reaction product in several manners. We provide for the necessary apparatus to dump the solution or suspension of one of the reactants into the solution or suspension of the other reactant in as short a time as possible. We found that on a large scale the time of mixing should not exceed 5 minutes. The apparatus must, of course, be provided with an efficient agitator which mixes the solutions as they come together.

The apparatus is also provided with a dumping device through which the reaction mass is passed into another apparatus for separating a liquid from a solid, such as a filter press, a centrifuge or a large vacuum filter.

The apparatus is also equipped in such a manner that a vacuum of, for instance, from 15 to 20, or more inches of mercury can be applied rapidly to the reaction mass, while thorough agitation is maintained.

In another embodiment of our invention we may cause a stream of a liquid composition of one of the reactants to impinge upon a liquid stream or jet of the other reactant, the streams being proportioned according to the desired reaction. We obtain in this manner practically instantaneous mixing. The mixed liquid is then immediately run into a vacuum pan and submitted to thorough agitation and a good vacuum, whereby the unabsorbed hydrogen sulphide is promptly liberated.

The slurry is then immediately run to a separation device of the type mentioned above.

These two streams can be co-mingled in various other manners, for example they can be introduced into one end of an open large pipe where they react and the resulting slurry leaves the pipe at the other end.

They can also be run simultaneously into an agitated vat, which can, if desired, be furnished with a device for continuously overflowing or withdrawing the completely reacted slurry.

We refer to these general methods of causing two or more streams of the solution to react quickly, or almost instantaneously, as "strike by co-mingling".

It will be realized that all parts of the reacting solution will be co-mingled and caused to react completely in less than 5 minutes, even though the operation of running together the several streams of liquid may be extended over a longer period of time.

For the production of the final pigment the endpoint of the strike can, for instance, be adjusted according to the inventions described and claimed in the aforesaid applications by Booge or Hanahan and Prince; or when reacting with solutions other than calcium hydrosulphide and zinc sulphate in such other manner as may be necessary. The dried co-precipitate is then calcined at temperatures of, for instance, between 600 and 900° C. and if desired in a non-oxidizing atmosphere.

The steps of adjusting the alkalinity or acidity of the endpoint and the calcination conditions are no part of the present invention and need not be discussed in more detail except as below in connection with the specific examples illustrating the results obtained by the application of our invention to the production of a finished pigment.

Specific operations showing a complete process of making a finished pigment embodying the steps of rapid striking and rapid handling as the distinguishing features are given in the following examples:

*Example 1.*—Calcium sulphate-zinc sulphide pigment containing more than equal molecular amounts of zinc sulphide.

A calcium hydrosulphide solution containing 15.7% $Ca(SH)_2$ was prepared by the extraction of calcium black ash (CaS) with an aqueous solution of hydrogen sulphide. The calcium hydrosulphide liquor had a specific gravity corresponding to 16.4° Bé. at 25° C.

1770 parts by weight of the above described calcium hydrosulphide liquor were placed in an acid and alkali resisting vessel equipped with an efficient agitator rotating at 60 R. P. M. To this was added at room temperature 2058 parts by weight of a pure zinc sulphate solution containing 29.5% $ZnSO_4$. The addition was made in such a manner that the total time of addition, mixing and reacting was less than 5 minutes.

The resulting slurry was immediately evacuated at 24 inches of mercury for 5 minutes and immediately filtered over vacuum. The precipitate was successively washed twice with 1100 parts of cold water. The total time elapsed from the mixing of the reactants to the completion of the washing was less than 4 hours, and of this approximately 2½ hours was occupied by the washing step. The total time during which the precipitate was in contact with the undiluted mother liquor was slightly in excess of one hour.

The filtrate from the precipitate contained 4.85 grams per liter of $ZnSO_4$ and 23.5 grams per liter of $H_2SO_4$.

It will be realized that it is important to reduce to a minimum the time of contact of the precipitate with the undiluted mother liquor as it is at this stage that the growth of the precipitated particles takes place most readily. The growth of the particles in contact with the wash water is considerably less.

The raw filter cake was dried overnight at 120° C. and subsequently calcined in a muffle furnace at 650° C. in a non-oxidizing atmosphere.

It must be understood that the calcium sulphate precipitates under these conditions in a hydrated form, mainly as gypsum, but that it is dehydrated during calcination, the particle size of the calcined precipitate, remaining of the same order of magnitude.

The pigment was quenched in water and wet ground in a ball mill for 8 hours, filtered and dried at 120° C.

The resultant pigment contained 48.2% ZnS and possessed a tinting strength of 193.

*Example 2.*—Preparation of a pigment containing equimolecular amounts of calcium sulphate and zinc sulphide.

A solution of 1620 parts of a zinc sulfate solution containing 29.5% $ZnSO_4$ was added at room temperature in less than 5 minutes and under good agitation to 2000 parts by weight of a calcium hydrosulphide solution containing 15.7% $Ca(SH)_2$.

The resulting slurry was evacuated at 24 inches of mercury for 5 minutes. The pH of the solution was found to be 6.2 and was adjusted to 4.0 by the addition of 35 parts of the same zinc sulphate solution. This operation required an additional time of 5 minutes. The strike was immediately filtered over vacuum. The total time required for the entire operation was less than 1 hour.

The raw filter cake was dried at 120° C. and calcined in a muffle furnace at 600° C. in a non-oxidizing atmosphere. The pigment was quenched in water and wet ground for 8 hours.

The resultant calcium sulphate-zinc sulphide pigment contained 41.4% ZnS and had a tinting strength of 174. In a parallel operation where the reacting solutions were mixed gradually over a period of 10 minutes and the filtration only started 30 minutes after completion of the strike the tinting strength of the finished pigment was only 158.

It will be understood that the above examples merely illustrate various phases of the production of calcium sulphate-zinc sulphide pigments embodying the features of rapid strike and handling and that our invention is not limited to any of the conditions described except in respect to this rapid strike and handling. Of these last features the rapid strike is the most important to obtain full utilization of the reactants and initially very small particle size, which is achieved if the reaction is completed in not more than 5 minutes.

The handling of the precipitate i. e., the operation of separating the mother liquor from the pigment and the washing thereof should not exceed 5 hours. It is also advisable to separate the pigment from the undiluted mother liquor in a relatively short period but we found that if this is carried out in not more than 1½ hours, with washing not exceeding 3½ hours, excellent pigments are obtained. The growth of the precipitated pigment particles can also be slowed down if the pigment slurry is diluted with water but in this case also handling should not exceed about 5 hours.

We claim:

1. In a manufacturing process for making a calcium sulphate-zinc sulphide pigment which comprises as one of its steps mixing a solution of calcium hydrosulphide with a solution of zinc sulphate and rapidly separating the precipitate obtained thereby from its mother liquor, the step of mixing said solutions and completing the formation of said precipitate in less than 5 minutes.

2. In a manufacturing process for making a calcium sulphate-zinc sulphide pigment which comprises the steps of mixing a solution of calcium hydrosulphide with a solution of zinc sulphate, completing the reaction within less than 5 minutes and filtering and washing the precipitate within less than 5 hours.

3. In a manufacturing process for making a calcium sulphate-zinc sulphide pigment which comprises the steps of mixing a solution of calcium hydrosulphide with a solution of zinc sulphate, completing the reaction in less than 5 minutes and separating the precipitate from the mother liquor within less than 1½ hours.

4. The process of claim 1 in which the zinc sulphate is reacted, in greater than an equimolecular proportion, with the calcium hydrosulphide.

5. The process of claim 2 in which the zinc sulphate is reacted, in greater than an equimolecular proportion, with the calcium hydrosulphide.

6. The process of claim 3 in which the zinc sulphate is reacted, in greater than an equimolecular proportion, with the calcium hydrosulphide.

7. In a manufacturing process for making a calcium sulphate-zinc sulphide pigment which comprises the steps of commingling a solution of calcium hydrosulphide with a solution of zinc sulphate, completing the reaction in less than 5 minutes and filtering and washing the precipitate so obtained within less than 5 hours.

8. The process of claim 7 in which the zinc sulphate is reacted, in greater than an equimolecular proportion, with the calcium hydrosulphide.

9. In a manufacturing process for making calcium sulphate-zinc sulphide pigments which comprises the steps of reacting in greater than an equimolecular proportion a solution of zinc sulphate with a solution of calcium hydrosulphide, completing the reaction in less than 5 minutes and separating the precipitate from the mother liquor, containing unreacted zinc sulphate, within less than 1½ hours.

10. In a process of preparing a co-precipitate of zinc sulphide and calcium sulphate of relatively small particle size which comprises the steps of rapidly mixing a solution of zinc sulphate with a solution of calcium hydrosulphide, the molecular amount of zinc sulphate being greater than that of the calcium hydrosulphide, the step of completing said mixing within such time that substantially no hydrogen sulphide is allowed to escape from the reaction mixture before substantially all the zinc sulphate present has been reacted to form zinc sulphide.

11. In a plant scale process for precipitating a calcium sulphate-zinc sulphide pigment by a batch precipitation operation the step of mixing a solution of calcium hydrosulphide with a solution of zinc sulphate and completing the reaction within less than 5 minutes.

KEITH H. BUTLER.
RODOLPHE A. GAGNON.
JAMES D. PRINCE.